United States Patent [19]
van Steenbrugge

[11] Patent Number: 5,502,436
[45] Date of Patent: Mar. 26, 1996

[54] METHOD OF IDENTIFYING A SIGNAL PATH AND SIGNAL PROCESSING APPARATUS

[75] Inventor: Bernard van Steenbrugge, Redhill, England

[73] Assignee: D2B Systems Company Limited, Redhill, England

[21] Appl. No.: 321,074

[22] Filed: Oct. 11, 1994

Related U.S. Application Data

[63] Continuation of Ser. No. 932,168, Aug. 19, 1992, abandoned.

[30] Foreign Application Priority Data

Aug. 21, 1991 [GB] United Kingdom ............ 9118040

[51] Int. Cl.$^6$ ................................ H04Q 1/00
[52] U.S. Cl. ...................... 340/825.05; 340/825.5
[58] Field of Search ............. 340/825.05, 825.5; 370/60, 94.1

[56] References Cited

U.S. PATENT DOCUMENTS

| | | | |
|---|---|---|---|
| 4,535,332 | 8/1985 | Miller | 340/825.5 |
| 4,583,088 | 4/1986 | Bux | 340/825.5 |
| 4,807,223 | 2/1989 | Wells | 340/825.5 |
| 4,819,229 | 4/1989 | Pritty | 340/825.5 |
| 4,879,714 | 11/1989 | Maeno | 340/825.05 |
| 4,905,233 | 2/1990 | Cain | 370/94.1 |
| 4,953,162 | 8/1990 | Lyons | 370/94.1 |

FOREIGN PATENT DOCUMENTS 2223114  6/1992  European Pat. Off. .

*Primary Examiner*—Donald J. Yusko
*Assistant Examiner*—Brian Zimmerman
*Attorney, Agent, or Firm*—David Schreiber

[57] ABSTRACT

A system of domestic audio-visual apparatuses (10–18) are connected on a one-to-one basis (20–26) for the exchange of video and audio signals. The apparatuses are also connected to a serial data bus (28,D2B) which allows distributed control messages to be sent and received by the apparatuses (addressable as 'devices') and elements of the apparatuses (subdevices). No apparatus has knowledge of the complete system of connections (20–26). An autonomous process (100, 102, 104, 110') can be initiated whereby a signal path from a source subdevice (64) to a destination subdevice (62) is identified step by step using the local knowledge of each apparatus. The speed of this process can be improved by initiating (101) a concurrent second autonomous process (106') whereby a signal path is identified from a third subdevice (42) to the destination subdevice. If the first autonomous process arrives at the third subdevice (42), the first process can be terminated (at *) and its identified signal path appended to that identified by the second autonomous process.

11 Claims, 2 Drawing Sheets

METHOD OF IDENTIFYING A SIGNAL PATH AND SIGNAL PROCESSING APPARATUS

This is a continuation of application Ser. No. 932,168, filed Aug. 19, 1992 now abandoned.

BACKGROUND OF THE INVENTION

The invention relates to a method of identifying a desired path for a user information signal between a first and second apparatus in a system of three or more apparatuses, the apparatuses of the system being interconnected on a one-to-one basis for the transmission of user information signals while being connected to a serial data bus having distributed control, the method comprising:

(a) initiating a first autonomous process whereby, using a sequence of data bus messages and starting from the first apparatus, a succession of one-to-one connections are identified through a succession of apparatuses of the system until the second apparatus is reached.

The invention further relates to a signal processing apparatus for implementing such a method in a system of interconnected apparatuses.

Such a method is known from GB 2 223 114 A (PHN 12678), the contents of which are hereby incorporated by reference. Apparatuses including control means for implementing the known method using a domestic digital bus (D2B) are for example Philips' colour television model 2070 and video cassette recorder (VCR) model VR6590. The serial data bus has many applications besides the present method, and it is desired that a standardised set of application protocols be developed and adhered to by many manufacturers of consumer audio/video apparatus, so that a data bus such as D2B can provide enhanced functionality and user friendliness to the great variety of apparatus types available today and in the future, with true inter-brand compatibility.

To this end, and with a view to minimising the cost and complexity of compatible apparatuses, it is a principle of the known system that any apparatus (addressable via the bus as a 'device') knows only whatever is needed for its own functionality. For example, after an initialization phase, each device knows (only) its own logical connections and the physical connections of its external plugs. Thus in the known method, the autonomous process referred to is performed step by step under the control of the various devices involved. At the end of the process, the information about the topology of the path connecting the first and second devices is not stored in any central location, but all local connections are known by the devices involved.

It is clearly desirable that a signal path should be established in response to a user command without any perceptible delay for the user. However, in a large system, it has been found that delays can become excessive due to the long sequence of local interactions necessary for exploring the network and confirming the success or failure of the method under local control.

It is an object of the invention to reduce the delay involved in identifying a signal path while remaining compatible with existing apparatus and while adhering to the principles set forth above.

SUMMARY OF THE INVENTION

A method as set forth in the opening paragraph is characterized in accordance with the present invention by:

(b) initiating concurrently with the first autonomous process a second autonomous process whereby a succession of one-to-one connections are identified, starting with a third apparatus, through a succession of apparatuses of the system until the second apparatus is reached; and (c) in the event that the third apparatus is reached at an intermediate stage in the first process terminating the first process and appending the path identified by the second process to the path identified so far by the first process.

If the third apparatus is not reached in the first process, then the first process proceeds to completion in the conventional manner without any time saving. If the third apparatus is reached, however, there is an immediate time saving, since the results of the concurrent first and second autonomous processes can be combined immediately by linking the two resulting paths in the memory of the third apparatus.

It will be appreciated that a method in accordance with the invention can be implemented with behaviour of the majority of apparatuses relative to the bus messages remaining identical with the behaviour expected of them in performance of the known method. Novel features are required only for initiating the second process and in the third apparatus, which must be able to act as a starting point for the second 'dummy' process and must intercept the first process if and when that process reaches the third apparatus, to create the link between the two parts of the signal path.

The invention therefore further provides an apparatus for processing user information signals, the apparatus being one-to-one connectable for the supply and/or receipt of such signals to and/or from (as the case may be) neighbouring apparatuses(es) in a system comprising three or more such apparatuses, and further having an interface to a serial data bus having distributed control, the apparatus including control means comprising:

means for receiving information that a signal path is desired to be identified between a first and a second apparatus of the system;

means for initiating a first autonomous process whereby, using a sequence of data bus messages and starting from the first apparatus, a succession of one-to-one connections are identified through a succession of apparatuses of the system until the second apparatus is reached;

means for initiating concurrently with the first autonomous process a second autonomous process whereby a succession of one-to-one connections are identified, starting with a third apparatus, through a succession of apparatuses of the system until the second apparatus is reached; and means operative in the event that the third apparatus is reached at an intermediate stage in the first process for terminating the first process and appending the path identified by the second process to the path identified so far by the first process.

While the apparatuses of the system are addressable via the serial data bus as devices, they may include elements addressable as subdevices of those device. In an apparatus according to the invention as set forth above, the control means may be addressable as a control subdevice within that device. Such a control subdevice can embody the intelligence of the system, and can control not only its own device but, via the bus and predefined application protocols, also any other device of the system, in performance of a user's wishes.

The control subdevice may be arranged to initiate the first autonomous process by composing and addressing a first initiating message to a first subdevice within the first apparatus.

The first subdevice may form a source subdevice of the desired signal path while the first initiating message specifies a destination subdevice of the desired signal path within the second apparatus. As in the known method, it is convenient always to begin from the source of the signal and work towards the destination. Clearly, though, an alternative method could work its way from destination to source.

In the second autonomous process connections for the user information signal may be identified starting from a switchbox subdevice within the third apparatus. Switchbox subdevices form the links within the apparatuses between the interconnections from apparatus to apparatus, and already provide the local control capability in the known system.

In the case where the apparatus including the control means in accordance with the invention is also the third apparatus, for example including the said switchbox, then the special features necessary to implement the invention can be confined within that apparatus, with no impact whatsoever on the bus protocols. Alternatively, additional bus messages can be defined to allow initiation of one or more second autonomous processes in third apparatuses that are not the one containing the control means.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS OF THE INVENTION

Figure 1:
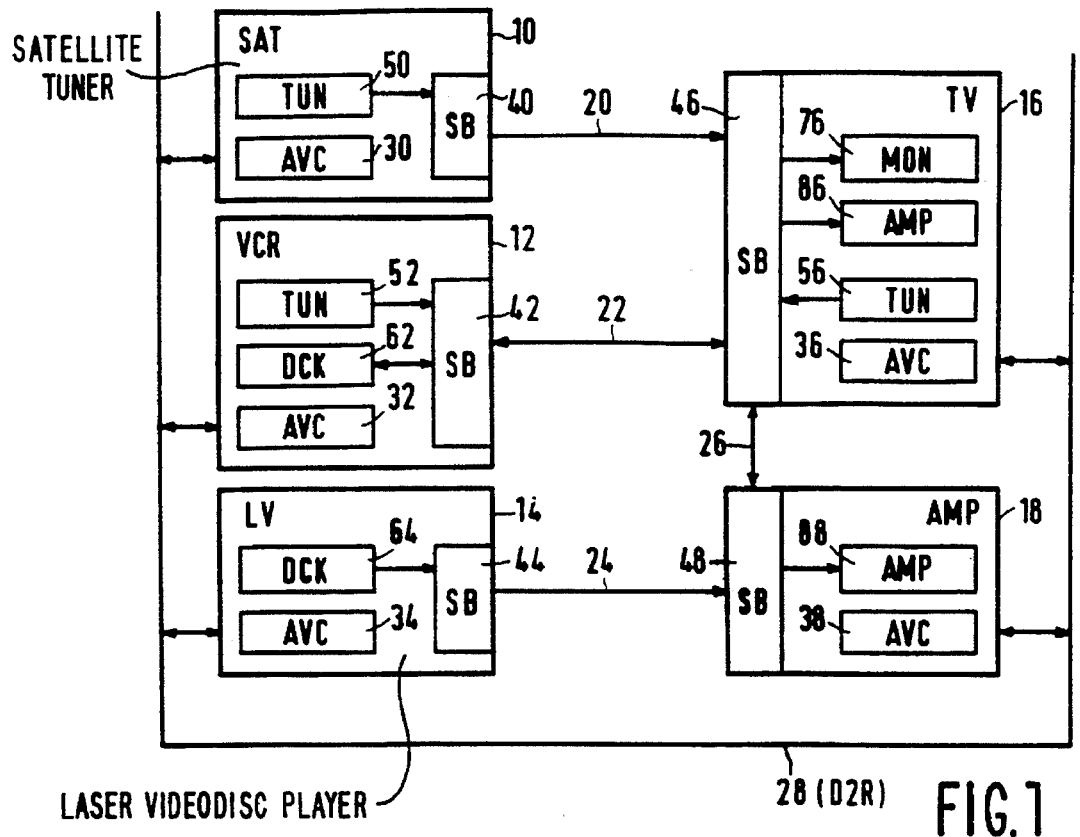
FIG. 1 shows home entertainment system comprising a number of audio/video signal processing apparatuses.

FIG. 1 shows an exemplary system of apparatuses, including a satellite tuner 10, a video cassette recorder (VCR) 12, a laser videodisc (LV) player 14, a television (TV) set 16 and an amplifier 18. These apparatuses are interconnected on a one-to-one basis by a limited network of audio/video cables 20,22,24 and 26. The apparatuses 10–18 are also connected to a common serial data bus 28.

The serial data bus 28 is in this embodiment a Domestic Digital Bus (D2B) as standardised by the International Electrotechnical Commission (IEC), Geneva. D2B provides for distributed control of the bus, and allows commands and other messages to be uniquely addressed for specific "devices", such as the apparatuses 10–18, and also for specific "subdevices" within each device.

Within each device 10–18 there are shown blocks representing D2B subdevices. The division of a device into subdevices is necessary only in a logical sense, that is to say, from the point of view of its behaviour relative to the D2B bus 28. In the physical implementation of the device, the apparatus, there may or may not be corresponding separate physical subdevices. In the embodiment shown, each device 10–18 includes one audio/video controller (AVC) type of subdevice, referenced 30–38 respectively, which provides the control intelligence for all subdevices within that device. Often, the control logic of the AVC and some or all of the other subdevices will be integrated in a single microcontroller. Similarly, subdevices within the same device will typically communicate directly, without use of the bus.

For the sake of simplicity, in the following description no further distinction will be made between the logical devices and subdevices and the physical apparatuses and functional elements they represent.

Each device 10–18 further includes a respective switchbox subdevice 40–48, which receives audio/video signals from external plugs of the device and relays them selectively to other subdevices within the device. For this purpose, 'internal plugs' are defined, at least logically, in the D2B model of each device 10–18.

In addition to AVC and switchbox subdevices, there are included:

in the satellite tuner device 10, a tuner subdevice 50, which is connected as a source of signals to the switchbox 40;

in the VCR device 12, a tuner subdevice 52 which is connected as a source of signals to switchbox 42, and a record/replay deck subdevice 62 which is connected as a source and destination of signals to the switchbox 42;

in the LV player device 14, a deck subdevice 64 which is connected as a source of signals to the switchbox 44;

in the TV set device 16, a video monitor subdevice 76 and an amplifier subdevice 86, connected to the switchbox 46 as destinations of video and audio signals respectively, and a tuner subdevice 56, connected as a source of signals to the switchbox 46, and in the amplifier device 18, an amplifier subdevice 88 which is connected as a destination of audio signals to the switchbox 48.

Since the functional units of the apparatuses 10–18 are addressable as D2B subdevices, any of the AVC subdevices 30–38 can take control of the bus and address commands to those subdevices. This is done for example by an AVC subdevice which has received and interpreted a user command (by user input means, not shown for clarity) and requires control of subdevices in other devices to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 40–48 can be commanded via the bus (or by its local AVC subdevice) to make audio and/or video connections between specified ones of its plugs.

As mentioned in the introduction, no device has knowledge of the entire system configuration. Instead, local knowledge, and the intelligence to access it, are distributed throughout the system. Thus switchbox 42 in the VCR device 12 is aware of its internal connections to the tuner and deck subdevices 52 and 62, and of its external connection (cable 22) to the switchbox 46 of the TV set device 16, but is not generally aware of the internal connections of the other devices or of the other cables 20,24,26.

In order that the system can nevertheless take care automatically of the detail of interconnecting a user's desired source and destination of signals, application protocols have been proposed in GB 2 223 114 A (PHN 12678) whereby an autonomous process is initiated, in which the source and switchbox subdevices take responsibility for building a signal path from the source to the destination using only their local knowledge.

Figure 2:
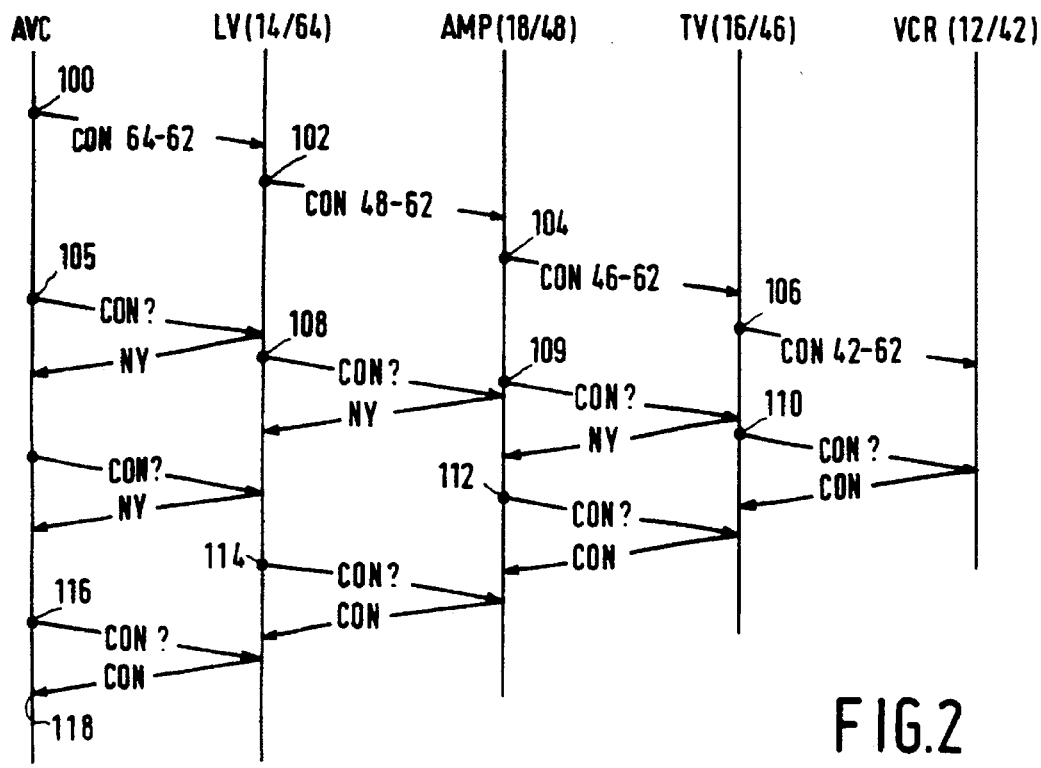
FIG. 2 illustrates the operation of a known method of identifying a signal path in the system of FIG. 1.

FIG. 2 represents schematically the operation of such a process when it is desired, by way of example, to make a video cassette recording from a laser videodisc. The aim of the process is therefore to make a signal path from device subdevice 64, as source, to deck subdevice 62, as destination. Time progresses from top to bottom in the figure. The actions of the AVC initiating the process are represented along the left-most vertical line of FIG. 2, while the actions in the relevant devices 14, 18, 16 and 12 are represented on successive vertical lines arranged from left to right. Directed arrows represent D2B messages generated by one device and addressed to another.

Having determined the required source and destination subdevices, and having further determined that its own local knowledge is inadequate for building the signal path, the AVC in question composes and sends to the source subdevice 64 in LV player 14 a command [CON 64-62] as shown at 100 in FIG. 2. The reference signs 64 and 62 corresponding to the source and destination subdevice respectively are shown as part of the command. This is for the purpose of illustration only, and it will be appreciated that in practice these subdevices will be specified as parameters in the command, by reference to their unique D2B device-subdevice addresses. Furthermore, such commands will in practice specify the individual plug numbers as necessary to make the connection. This detail is unimportant for an understanding of the present invention, and the reader is referred to GB 2 223 114 A and the D2B standard for further particulars.

The LV player 14, upon receipt of the command [CON 64-62] determines that it does not have the knowledge to complete the path. However, knowing that it is connected to switchbox 48 of the amplifier 18, the LV player 14 at 102 issues a command [CON 48-62] to that switchbox 48 as a first step in building a signal path to the destination. Similarly at 104, the amplifier 18 issues a command [CON 46-62] to the switchbox 46 in the TV set 16, which in turn sends a command [CON 42-62] to the switchbox 42 in the VCR 12, each requesting connection to deck subdevice 62.

At some time after issuing a connect command, the originating subdevice (for example the AVC at 105, or source subdevice 64 at 108) issues a request [CON?] to the same subdevice, to discover if the connection has been made. The responses [NY] shown for these messages indicate that a connection is not yet made, but that the process is continuing. A response [NOCON] is defined to indicate that the attempt to find a path has failed (not shown in the example), at least so far as the responding subdevice is concerned.

Upon receipt of the command [CON 42-62], the VCR switchbox 42 determines whether the desired connection can be made from cable 22 through switchbox 42 to the input of deck subdevice 62. This will not always be the case, since, for example, the VCR 12 may already be recording a program from its internal tuner 52 and may refuse to interrupt this operation without an appropriate priority code. Assuming there is no such bar, however, the connection is made.

At 110, the TV set switchbox 46 issues its first [CON?] request to the VCR switchbox 42 and immediately receives the response [CON] indicating a successful connection. Thereafter, at 112, 114 and 116, subsequent [CON?] requests down the chain of apparatuses are met with affirmative [CON] responses, until finally the AVC is advised at 118 that the signal path from source to destination is complete.

It will be appreciated that the process initiated at 100 when the AVC issues the command [CON 64-62] is an autonomous process executed in a distributed fashion. In other words, once a connect command is received by a subdevice, the local intelligence of that subdevice determines what subsequent action is required to effect the command. This action may comprise delegating the task to the local intelligence of another connected device, as occurs at 102, 104 and 106 in the example of FIG. 2.

Figure 3:
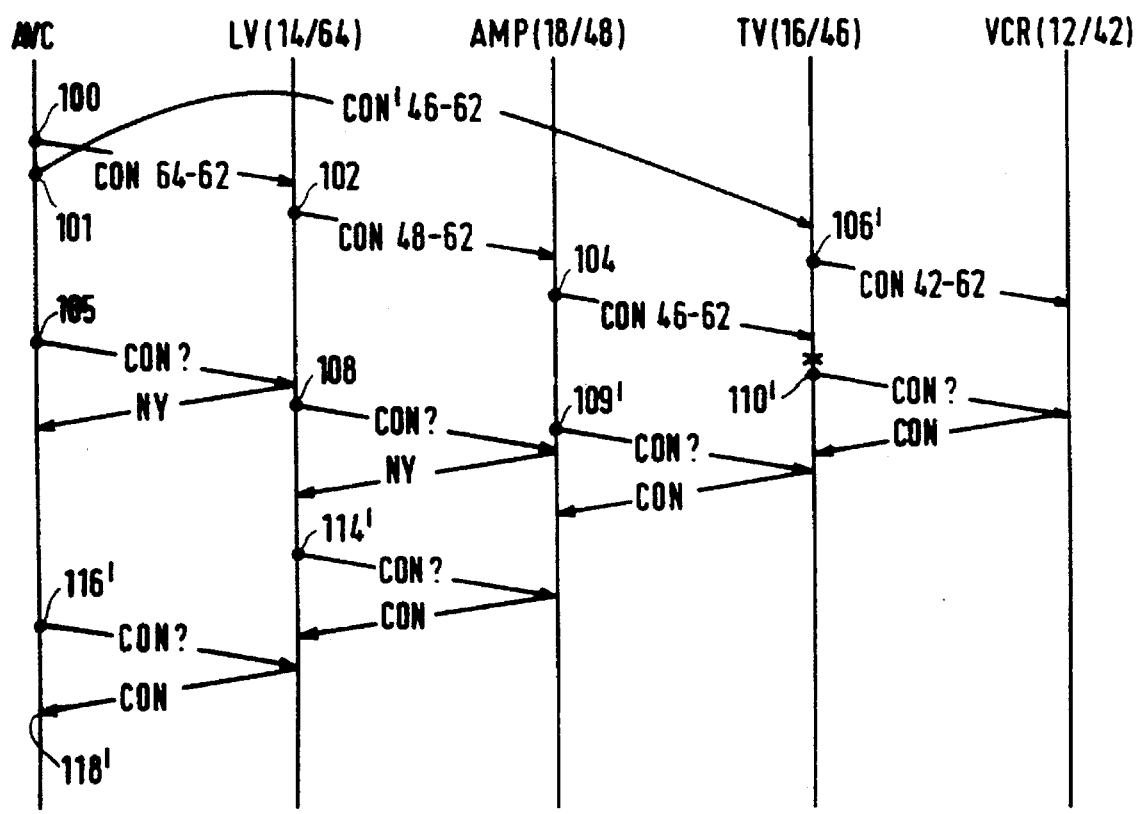
FIG. 3 illustrates the operation of a method in accordance with the invention.

In FIG. 3, an alternative, but entirely compatible method is illustrated in which a second autonomous process is initiated in parallel with that described above, with the aim of reducing the delay between points 100 and 118, that is the delay involved in identifying and setting up the signal path.

Steps corresponding to those of the FIG. 2 method are given the same references in FIG. 3. Other steps, whose nature or place in the sequence is changed, are numbered with primed numbers, for example 118', where there exists a nearly corresponding step of the FIG. 2 method, or are given new reference numbers. The first change in FIG. 3 is that, immediately following the initiating command [CON 64-62] at 100, the AVC issues a further connect command [CON' 46-62] to the TV set switchbox 46. This initiates a second autonomous process, whose aim is to identify a path from the switchbox 46 of the TV set 16 to the destination subdevice 62.

In response to this, and in parallel with the operation of the first autonomous process at steps 102, 104, the TV set switchbox 46 autonomously issues at 106' a command [CON 42-62] to the VCR switchbox 42 in its attempt to establish a connection to the destination subdevice 62. This connection is subsequently verified with the [CON?] request at 110'. When, subsequently, the command [CON 46-62] issued at 104 is received by the TV set switchbox 46, it is detected that this command specifies the same destination as the further connect command [CON' 46-62], and at the point marked with an asterisk ('*') the TV set switchbox 46 combines the two autonomous processes into one. Thus, after the affirmative response [CON] is received from the VCR switchbox 42 by the TV set switchbox 46, the TV set switchbox 46 is then able to respond to the request [CON?] which is issued at 109' in the affirmative. This contrasts with the response [NY] (not yet) given to the request at 109 in the method of FIG. 2, and indicates that a time saving has been achieved by the parallel execution of two processes. The requests 114' and 116' can obtain affirmative responses sooner than was possible in FIG. 2. This saving would be greater still if the path from the TV set 16 to the destination were longer.

It may be noted that a saving is achieved also in cases where the second autonomous process yields a negative ([NOCON]) result, since the first autonomous process would otherwise have had to spend time itself to discover the fruitlessness of that particular branch of the network. Only when the paths identified by the parallel processes are completely mutually exclusive is no saving possible and, even in those cases, there has been no extra delay incurred by the operation of the second process, assuming no overload of bus traffic.

So far, it has not been specified which AVC is initiating the method of FIG. 3. In principle, any AVC can be used, but it is noted that, compared with the known apparatus, this AVC must have the additional facility to send the special command [CON'—] and the TV set switchbox 46 must have the additional features required to recognise and combine the paths identified by the two parallel processes. This gives rise to a particular embodiment in which the AVC is the AVC subdevice 36 of the TV set 16 itself, in which case the additional facilities are all located in the same apparatus. The method of FIG. 3 can then be effected by the TV set 16 while all the other apparatuses 10, 12, 14, 18 are only required to behave exactly as under the known method. In this way, a performance improvement is available with no problems of compatibility. In fact, in such an embodiment the special command [CON'—] need not be sent via the D2B bus or even defined at all, except within the physical implementation of the one apparatus. Of course, in that case, the new method is not effective where the apparatus having the novel features also contains the source or destination of the audio/video signal.

A further feature that could be added to some or all of the apparatuses to improve the speed of establishing a signal path might be 'connection completed' message [CON-CMPL]. This could be sent by a switchbox or source subdevice to report immediately that the connection is established, rather than waiting for a [CON?] request from the subdevice which requested connection. The [CON?] request can still be sent after a certain time interval has elapsed, to obtain confirmation by the known method. This ensures full compatibility with the known apparatuses in which the [CON-CMPL] message is not implemented.

The [CON-CMPL] message can be used independently or in combination with the second autonomous process of the present invention. Early confirmation of established signal path can also be obtained by use of a subdevice status request protocol as described in our copending European patent application 92200771.1 (PHQ 91019).

From reading the present disclosure, other variations and applications will be apparent to persons skilled in the art. Such variations may involve other features which are already known in the design, manufacture and use of local communication bus systems, audio/video apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features give notice that new claims may be formulated to such features and/or combinations of such features during the prosecution of the present application or of any further application derived therefrom.

I claim:

1. In a system having at least three apparatuses, each apparatus having at least one user information signal path connection to adjacent apparatuses, each apparatus additionally coupled to a serial data bus having distributed control for the transmission of data bus messages, a method of identifying, by use of serial data bus messages, a desired path for transmitting a user information signal between a first one of said apparatuses and a second one of said apparatuses, the method comprising the steps of:

(a) initiating a first autonomous process whereby a succession of said user interface signal path connections are identified through a succession of apparatuses of the system from the first apparatus to the second apparatus;

(b) initiating, concurrently with first autonomous process, a second autonomous process whereby a succession of said user interface signal path connections are identified, starting with a third apparatus, through a succession of apparatuses of the system until the second apparatus is reached;

(c) in the event that the third apparatus is reached during the first process, terminating the first process and appending the path identified so far by the second process to the path identified so far by the first process between the first apparatus and the third apparatus.

2. A method as claimed 1 wherein each apparatus is addressable as a device via the serial data bus and wherein each apparatus includes an element addressable as a subdevice of that device.

3. A method as claimed in claim 2 wherein step (a) includes composing and transmitting via said serial data bus a first initiating message to a first subdevice within the first apparatus.

4. A method as claimed in claim 3 wherein the first subdevice forms a source subdevice of the desired user information signal path and wherein the first initiating serial data bus message specifies a destination subdevice of the desired user information signal path, within the second apparatus.

5. A system including at least three apparatuses for transmitting a user information signal through a succession of user information signal paths from a first apparatus to a second apparatus, the system comprising:

a plurality of signal path connector means, each connected between a respective pair of said apparatuses and defining a user information signal path therebetween;

a serial data bus to which each of said apparatuses is connected, said data bus having distributed control and providing means for transmission of data bus messages;

means for receiving information that the signal path is desired to be identified between the first apparatus and the second apparatus;

means for initiating a first autonomous process whereby, using a sequence of data bus messages and starting from the first apparatus, a succession of said user information signal paths are identified through a succession of apparatuses of the system until the second apparatus is reached;

means for initiating concurrently with the first autonomous process a second autonomous process whereby a succession of said user information signal paths are identified, starting with a third apparatus, through a succession of apparatuses of the system until the second apparatus is reached; and means operative in the event that the third apparatus is reached at an intermediate stage in the first process for terminating said first process and appending the path identified so far by the second process to the path identified so far by the first process between the first apparatus and the third apparatus.

6. The system as claimed in claim 5, wherein the first apparatus and the second apparatus are addressable as devices via the serial data bus and wherein the first apparatus and second apparatus each include an element addressable as a subdevice.

7. The system as claimed in claim 6, wherein one of the apparatuses initiates the first autonomous process by composing and addressing a first initiating message via said serial data bus to a first subdevice within the first apparatus.

8. The system as claimed in claim 7, wherein the subdevice of the first apparatus forms a source subdevice of the desired signal path and wherein the first initiating message specifies as a destination, the subdevice within the second apparatus.

9. The system as claimed in claim 6, wherein the third apparatus includes an element addressable as a subdevice and wherein, in the second autonomous process, the desired signal path for the user information signal starts from the subdevice within the third apparatus.

10. The system as claimed in claim 8, wherein the third apparatus includes an element addressable as a subdevice and wherein, in the second autonomous process, the desired signal path for the user information signal starts from the subdevice within the third apparatus.

11. The system as claimed in claim 7, wherein the third apparatus includes an element addressable as a subdevice and wherein, in the second autonomous process, the desired signal path for the user information signal starts from the subdevice within the third apparatus.

* * * * *